United States Patent [19]

Pahr

[11] Patent Number: 5,293,278
[45] Date of Patent: Mar. 8, 1994

[54] CIRCUIT FOR SELECTIVELY SWITCHING READ SIGNALS FROM A MULTIPLE MAGNETIC HEAD INTO A MEMORY

[75] Inventor: Per O. Pahr, Lier, Norway
[73] Assignee: Tandberg Data A/S, Norway
[21] Appl. No.: 850,821
[22] Filed: Mar. 13, 1992

[30] Foreign Application Priority Data

Mar. 20, 1991 [DE] Fed. Rep. of Germany ....... 4109589

[51] Int. Cl.⁵ .............................................. G11B 5/02
[52] U.S. Cl. .......................................... 36/67; 360/61
[58] Field of Search ..................... 360/67, 68, 61, 62, 360/64, 46, 63

[56] References Cited

U.S. PATENT DOCUMENTS 3,505,662 4/1970 Hibner .
4,523,238 6/1985 Keel et al. ............................. 360/46
4,768,111 8/1988 Kranabetter ......................... 360/62

FOREIGN PATENT DOCUMENTS

2208829 8/1972 Fed. Rep. of Germany .

Primary Examiner—Donald Hajec
Assistant Examiner—Jhihan Clark
Attorney, Agent, or Firm—Hill, Steadman & Simpson

[57] ABSTRACT

A circuit for selective switching through of read signals of a multiple magnetic head in a magnetic layer memory, wherein each magnetic system of a multiple magnetic head is associated with a preamplifier which has spatially separated input and final stages, the input stage being located directly on the multiple magnetic head and connected to the final stage by means of a flexible connecting line, the final stage being spatially associated with a read channel, the final stage having switching means for the selective closing of a current path between the final stage and the associated input stage by means of a selection signal; the input stage being so constructed to be in an idle state for as long as the associated final stage is not activated. Preferably, outputs of all the final stages are connected in parallel and coupled into the read channel across an output stage constructed as a differential voltage amplifier.

17 Claims, 3 Drawing Sheets

CIRCUIT FOR SELECTIVELY SWITCHING READ SIGNALS FROM A MULTIPLE MAGNETIC HEAD INTO A MEMORY

BACKGROUND OF THE INVENTION

The invention generally relates to a circuit configuration for the selective switching of read signals of one of at least two magnetic systems of a multiple magnetic head onto a common read channel of a magnetic layer memory. More particularly, the invention relates to a circuit configuration for the selective switching through of read signals of one of at least two magnetic systems of a multiple magnetic head onto a read channel of a magnetic layer memory using preamplifiers connected both to one of the magnetic systems and to a selecting device.

In magnetic layer memories, a magnetic head, which is stationary in its operating state, is used for storing or reading information, and a magnetic storage medium (e.g., a magnetic tape) is moved with respect thereto. In the relevant art, numerous magnetic head constructions are known which are matched to their intended uses.

In the simplest case, the magnetic head comprises a single magnetic system with a magnetic core forming a magnetic gap and a magnetic or field coil wound around the core for at least two operating functions; read and write; as well as, optionally, erasure of stored information. However, particularly in the case of magnetic layer memories, it has proved advantageous to provide individual, partial magnetic heads for each of these different operating functions.

Considering the magnetic tape feed direction, a read head frequently is positioned between a write head and an erasure or erase head. Such a magnetic head construction not only makes it possible to specifically optimize the individual partial heads with respect to their functions, but the construction also permits a check read of information recorded immediately preceding during the writing process while it is still taking place. Such a magnetic head formed from partial magnetic heads can be referred to as a combined magnetic head or a read/write head.

Particularly in the case of magnetic tape memories, it is also known to use multiple magnetic head structures. The term "multiple magnetic head" is used to designate a magnetic head which has a plurality of magnetic systems positioned transversely with respect to the feed direction of the associated tape and which are in each case spatially associated with respect to a recording track on the tape. Such a multiple magnetic head makes it possible either to simultaneously write information in parallel in several information tracks or to simultaneously read out information from several information tracks.

However, even in those situations in which a writing or reading process is carried out only for a single information track, a correspondingly constructed multiple magnetic head can still be advantageous, because it, for example, can permit the storage processes for both magnetic tape feed directions. Based on an axis aligned at right angles to the longitudinal direction of the tape, at least two magnetic systems are placed adjacent to each other, each magnetic system case containing at least one writing and one reading partial head; and, optionally, an erase head. The write and read partial heads of these two magnetic systems are mutually transposed with respect to their positions in the direction of the tape longitudinal axis. With such a multiple magnetic head, this arrangement makes it possible to store information with a directly following check read in both feed directions of the magnetic tape. On the basis of this principle a plurality of multiple magnetic head constructions are conceivable involving the juxtaposing of a plurality of magnetic systems at right angles to the longitudinal direction of the magnetic tape.

The different constructions of multiple magnetic heads can provide special advantages with respect to positioning processes during the operation of magnetic tape memories or can be favorable in connection with tracking or track holding. However, the details of the described basic constructions of multiple magnetic heads are not most important herein. Instead, importance attaches to the selection problem which arises if and when, with such a multiple magnetic head, information is only read out of a selected information track and prepared in a read channel for the recovery of the information track and prepared in a read channel for the recovery of the information stored in this information track.

In principle this means that in the operating state "read", read signal voltages are simultaneously induced in all the partial read heads of the multiple magnetic head during the overflow of associated information tracks. However, only the read signals of the instantaneously selected information track are to be fed into the read channel and processed for the recovery of the stored information. For this it is necessary to have a selecting device, which can be referred to as a channel switch.

Normally read signals supplied by a magnetic system are initially preamplified and then further processed. It is obvious to place the channel switch either directly between the individual magnetic systems and a common preamplifier or to provide for each magnetic system an individual preamplifier and to install the channel switch between the parallel outputs of the plurality of preamplifiers and the inputs of one read channel. Such a solution involves considerable effort and expenditure and is also relatively complicated due to the high impedance values which have to be taken into account. Due to the low useful signal voltages on the input side of the channel switch, among other things, special precautions must be taken with respect to undesirable crosstalk of the unselected magnetic systems on the circuit of the selected magnetic system, because the channel switch must only selectively switch through the read signals supplied by the selected magnetic system having a lower signal amplitude than the useful signals.

Another important problem is the difficulty of providing an adequate common-mode rejection in order to achieve a desired signal-to-noise ratio in the switched through read signals. However, if individual preamplifiers are provided and the channel switch is arranged downstream thereof, the actual channel switch must process higher power levels and must consequently have a more complicated construction.

SUMMARY OF THE INVENTION

The present invention provides a circuit arrangement wherein the selective switching through of the read signals of a selected magnetic system on the read channel of the magnetic layer memory takes place with simple means and in a troublefree and operationally reliable manner.

In an embodiment, the invention provides a clearly defined spatial arrangement of two successive stages of a plurality of preamplifiers, each associated with one of the magnetic systems of the multiple magnetic head. Each preamplifier has an input stage which, with the multiple magnetic head, directly forms a mechanical unit. A following, second or final stage of each preamplifier is arranged in spatially separated manner therefrom on a circuit board, which carries all the read electronics, i.e., those circuit elements which are normally referred to as the read channel. The two preamplifier stages are only interconnected by a flexible connecting line, and there is no individual supply line for the input stage of each preamplifier, which stage is spatially removed from the read electronics. This is possible as a result of the fact that the circuit concept of the preamplifier of the present invention is such that the switching elements of the preamplifier input stage receive their direct current bias directly via the signal lines connected thereto.

From a functional standpoint, in the first embodiment of the invention, the circuit principle is such that the input stages of the preamplifiers behave in a manner similar to voltage-controlled resistors. The outputs of all the input stages, which are not selected at a given time, are left in a high-impedance state, so that, ideally, no signals are transmitted across the associated signal lines into the corresponding final stages of the non-activated preamplifiers. This operation eliminates possible crosstalk from one preamplifier to the other and consequently interference in the preparation of the read signals of a selected magnetic system by influential signal voltages induced during the reading process in the presently unused magnetic systems.

This operating principle can be described as follows.

As in a conventional solution, a shielded or unshielded, multicore, flexible connecting line connects the magnetic systems of a multiple magnetic head to the read electronics positioned in spatial manner (i.e., spaced apart) with respect thereto. It is not possible to directly gather from the signal states at the interface to the read electronics that active circuits are directly spatially associated with the multiple magnetic head. Thus, no additional supply lines lead, e.g., from the interface to the multiple magnetic head. However, the essential difference, when compared with the conventional solution, is that, apart from the unavoidable interference voltage components which always occur in practice, read signals are only transmitted into the read electronics by an activated magnetic system, whereas all the signal lines, which are connected to presently unselected magnetic systems appear terminated in a high-impedance manner.

As is apparent from the particular embodiments of the invention set forth in the claims, the discussed circuit principle can be achieved in a plurality of ways. It is advantageous for the active elements to be used in pairs in the input or final stage of a preamplifier. Thus, transistor pairs built up in a common circuit and, optionally, gate arrays can be used in the circuit design. It follows therefore that the paired, active elements used have identical electrical characteristics, which simplifies the realization in the circuitry of desired characteristics, e.g., with respect to a good signal-to-noise ratio, as well as a high common-mode rejection.

With respect to the signal-to-noise ratio, commercially available integrated amplifier circuits are not sufficiently interference-proof. However, discreet, often paired packed transistors for high switching frequencies and with very low base resistance are available, which consequently contribute only a little to thermally caused interference voltages and which can be used with advantage in the input stages.

Interference voltages are in particular absorbed by the magnet coils of the magnetic systems and by the connecting lines to the read channel. It is therefore important to make the useful signal level on these connecting lines as high as possible. However, as is known, the useful signal level is proportional to the number of turns of the magnet coils and the self-resonant frequency drops with increasing numbers of turns, which can be attributed to the capacitive load of the circuit arrangement. The capacitive load results from the sum of the interturn capacitances, as well as external capacitances, i.e., the further circuit capacitances. The inventively constructed preamplifiers make it possible to reduce these external capacitances, so that the signal level can be optimized with a given self-resonant frequency with an increased number of turns. This is particularly important for the circuit design in the case of inductive magnetic heads with magnetic gaps below 1 $\mu$m.

As discussed, another issue is common-mode rejection. Most interfering voltage components coupled into the circuit arrangement upstream of, i.e., prior to, the read channel are common-mode voltages. In magnetic tape units then voltages essentially come from the tape drive motor or its supply lines and are coupled in inductively via the magnet coil turns and via the supply lines.

In order to not lose the aforementioned advantage of a relatively high useful signal level, it is important for the final stage of the preamplifier and the further connected circuit parts to be designed in such a way that they have a high common-mode rejection. The present inventive circuit concept takes into account this requirement.

In addition, the complete circuit arrangement provides for low power consumption, because it is a prerequisite that a useful current only flows in the selected circuit parts. Thus, the circuit arrangement can be put into effect with inexpensive, but still interference-proof switching elements.

These and other features of the invention will become clearer with reference to the following detailed description of the presently preferred embodiments and accompanying drawings.

DETAILED DESCRIPTION OF THE PRESENTLY PREFERRED EMBODIMENTS

In magnetic layer memories, e.g., magnetic tape cassette units, it is often standard practice to record on the record medium, i.e., magnetic tape, data or information in a plurality of parallel tracks, so as to exhaust to the maximum the storage capacity of the record medium. However, in many cases, the data or information is only read from a single, selected information track.

It is sufficient for this purpose to have a magnetic head with a single read coil, which is then positioned with its magnetic gap over the selected information track. However, as is known, multiple magnetic heads can also be used, which e.g., facilitates track selection. In the present case the specific construction of such multiple magnetic heads is of minor significance. Those of ordinary skill in the art should be aware of a number of solutions, so that there is no need to explain in detail here the various possible designs of a multiple magnetic head. What is important for the present invention is that the read electronics of a magnetic layer memory, which is equipped with a multiple magnetic head, is able to selectively activate a specific magnetic head system during a reading process. The activated magnetic head system is to be individually switchable through in troublefree manner to a single read channel, so that read signals supplied there by the magnetic head system can be further processed and finally evaluated.

Figure 1:
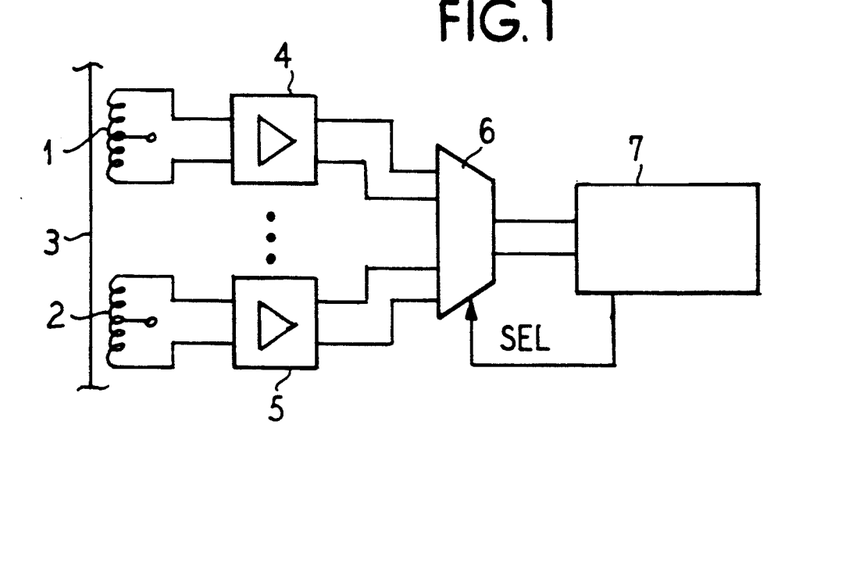
FIG. 1 illustrates a block circuit diagram of an memory, which are selectively activatable, in order to switch through a read signal of an activated magnetic head system to a read channel.

In FIG. 1 there is diagrammatically illustrated one such circuit arrangement. Illustrated as representative for a plurality of magnetic head systems of a magnetic head are two magnetic or field coils 1 and 2, which scan a magnetic tape 3. With each of these magnetic coils is associated a preamplifier 4 or 5, respectively, whose output signals are supplied in parallel to a selecting unit 6 which, prompted by a selection signal SEL, selectively switches through the outputs of one of the preamplifiers 4 and 5 to a read channel 7. The further preparation and evaluation of the switched through read signal can take place in a conventional manner.

However, importance is attached to the way in which a specific magnetic head system is selected. In conventional streamer tape units, a typical use in which multiple magnetic heads are simultaneously used for reading one or two information tracks, such a selecting circuit can either be positioned between the magnetic coils and the preamplifiers or, downstream of the preamplifiers, as shown in FIG. 1. If located in the conduction path between the magnet coils and the preamplifiers, then the construction of such a selecting circuit becomes relatively complicated and difficult to realize. This is due to, on the one hand, the high impedance values in the transmission line circuit and, on the other hand, the fact that the instantaneously unselected magnetic coils supply interference signals, which can lead to crosstalk or can couple in common-mode interference. However, if the selection of a specific magnetic head system only takes place downstream of the associated preamplifier, then the selection unit, i.e., the actual switch, is much more highly loaded. Therefore, both solutions have disadvantages.

The invention provides a solution to this dilemma. To this end, to each magnetic coil 1 and 2 of a multiple magnetic head is spatially directly associated an input stage of a preamplifier, whose actual final or power stage is located in spatially separated manner therefrom, i.e. on a circuit board for the entire read electronics. The input stage of the preamplifier associated with the magnet coil 1 or 2 is connected to its final power output stage via twisted lines. The coupling networks provided in the input stage are designed in such a way that they block themselves (i.e., self-blocking) if the connected final power output stage of the preamplifier is not activated. As a result of this circuit configuration, only the instantaneously selected magnetic head system supplies across its connected input stage of the preamplifier, signal components to the selecting unit 6, whereas the other, unselected magnetic head systems do not merely rum empty, but as a result of the aforementioned defined function of the preamplifier input stage, are blocked or stopped. Thus, in this state they cannot couple interference signal components into the selection unit 6.

Figure 6:
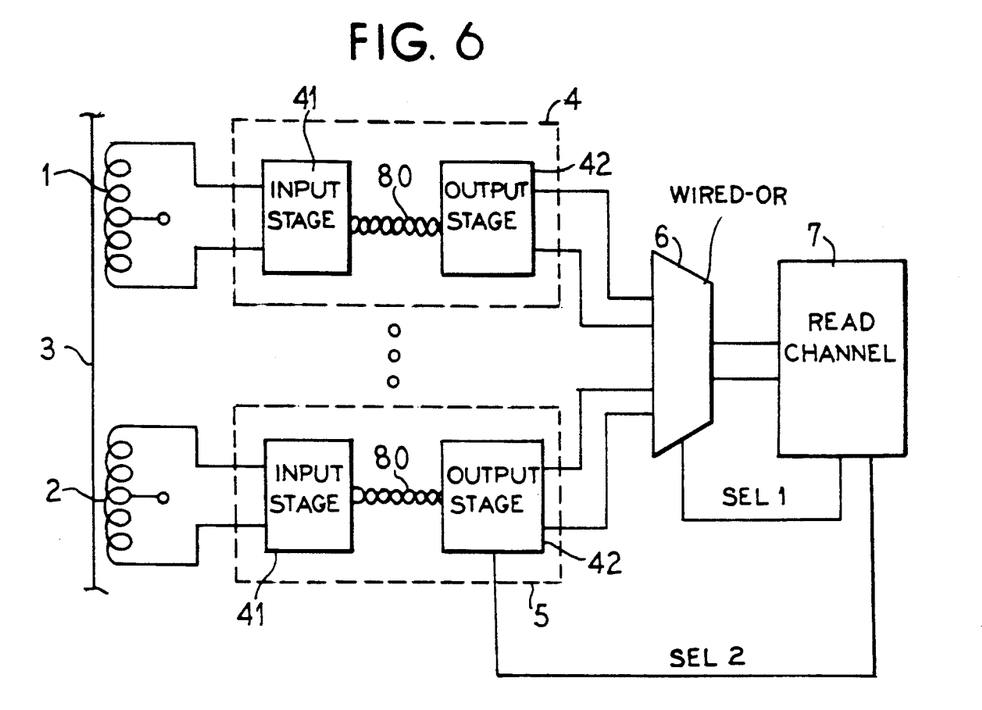
FIG. 6 illustrates a block diagram of a system incorporating principles of the invention.

In FIG. 6 there is illustrated in block diagram form an embodiment of such a circuit configuration. As illustrated, each preamplifier stage, stage 4 comprises separated input and output stages 41 and 42, respectively.

Figure 2:
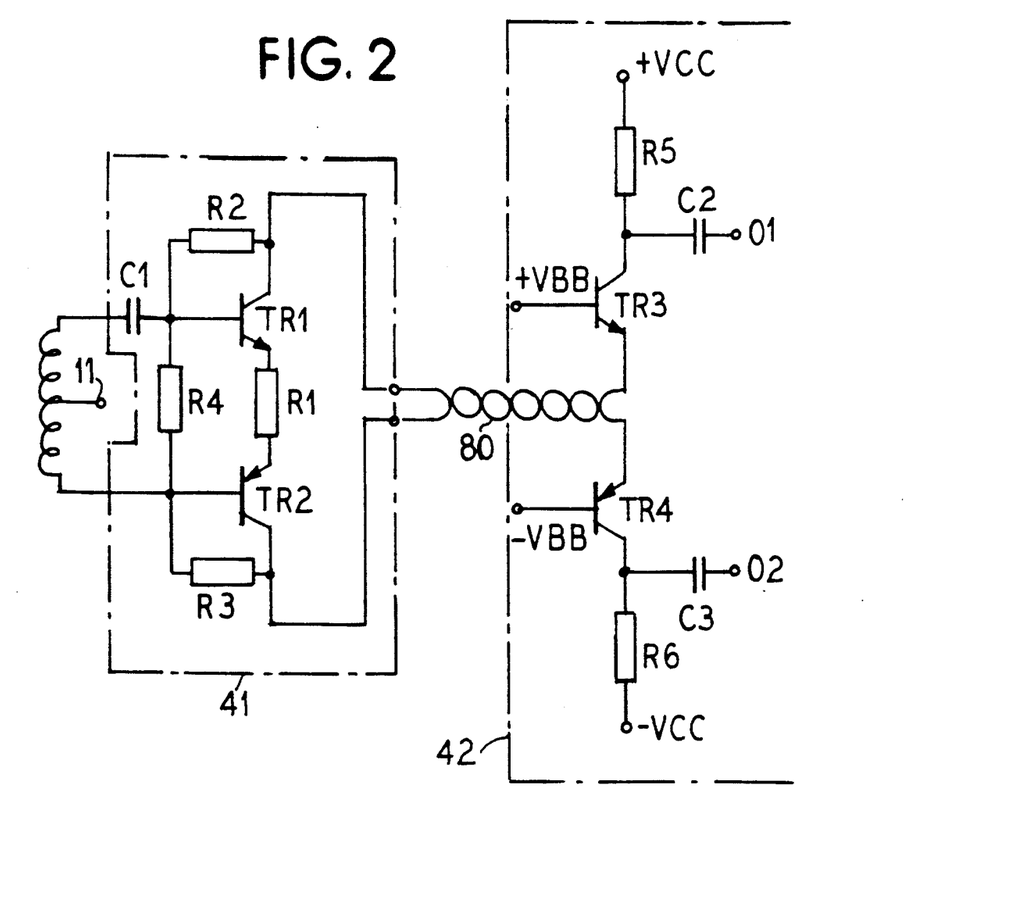
FIG. 2 illustrates a preamplifier constructed with complimentary technology and which has an input stage that is directly connected to the coil of a magnetic system and which has a final stage connected to a read channel, the input and final stages being spatially separated by interconnected by a twisted two-wire line, the final stage being located on a spatially separated read electronics circuit.

In FIG. 2 there is illustrated in greater detail an embodiment of such split a preamplifier circuit configuration. As illustrated, the input stage 41 of a preamplifier 4 is directly spatially associated with, e.g., the magnet coil 1 and comprises two complimentary transistors TR1 and TR2, whose emitter-emitter junctions are switched in series across a relatively low-value (i.e., low resistance) resistor R1 (i.e., their emitters are coupled together by the resistor R1). The base of the first transistor TR1 is connected to one end of the magnet coil 1 via a first capacitor C1 and the base of the other transistor TR2 is directly connected to the other end of the magnet coil 1. A possible center tap of the magnet coil 1 remains unused, in this configuration.

In order to reliably block the collector-base current path of the complimentary transistors TR1 and TR2 in the unselected state, a high-impedance coupling network is provided. The latter comprises a resistor R2 coupled between the base and collector of the transistor TR1 and a similar resistor R3 coupled between the base and collector of the transistor TR2, as well as a further resistor R4, which is coupled between the two base terminals of the complimentary transistors TR1 and TR2.

The two outputs, i.e., the collector terminals of the two complimentary transistors TR1 and TR2 are connected by means of a two-wire "twisted pair" connecting line 80, i.e., a pair of lines twisted together, to a spatially separated final power stage 42 of the preamplifier 4, which stage 42 is located on the circuit board for the magnetic layer memory read electronics. This final stage 42 once again comprises a pair of further complimentary transistors TR3 and TR4, to each of whose emitters are respectively connected one of the lines of the connecting line 80. The collectors of these two further complimentary transistors TR3 and TR4 are coupled to positive and negative supply voltages VCC, respectively, via respective collector resistors R5 and R6. Each base of these two further complimentary transistors TR3 and TR4 is supplied in the selected state with a positive or negative base voltage, respectively, which switches the corresponding complimentary transistors into conductive states. This gives a switched through current path over the resulting four series-connected complimentary transistors TR3, TR1, TR2 and TR4. Coupling capacitors C2 and C3, which are in each case connected to one of the collectors of the further complimentary transistors TR3 or TR4, supply the read signals delivered by the magnet coil 1 and subsequently preamplified to outputs 01 and 02 of the preamplifier power stage in the form of output signals.

The circuit arrangement illustrated in FIG. 2 has the following essential characteristics. The preamplifier 4 connected to the magnet coil 1 comprises an input stage 41, which is directly spatially located on the magnetic head. This spatial unit is indicated in FIG. 2 by the magnet coil 1 directly connected to the inputs of the input stage 41. However, the final stage 42 of this preamplifier is directly located on the circuit board for the entire read electronics of the magnetic layer memory and is connected to the input stage 41 solely via the two-wire, twisted pair connecting line 80. In other words, considering the input side of the read electronic circuit board, in each case only one two-wire twisted pair connecting line leads to a magnetic head system, e.g., the magnet coil 1. The circuit part of the preamplifier spatially directly associated with this magnet coil can be considered as a voltage-controlled resistor and it requires no individual supply lines, apart from the two-wire twisted pair connecting line 80.

It is also important for the selection switching function that the input stage 41 of the preamplifier 4 directly associated with e.g., the magnet coil 1 is itself biased and switches into a high-impedance state on the output side in its unselected state. The circuit arrangement of the preamplifier 4 is designed in such a way that the common-mode-voltages on both parts of the magnet coil 1 substantially see the same impedance. However, remaining common-mode-voltages, which are then transmitted to both wires of the twisted pair connecting line 80, appear as in-phase voltages at the collectors of the further complimentary transistors TR3 and TR4. Thus, these signal components can also be suppressed if the outputs 01 and 02 of the preamplifier 4 are connected to a differential amplifier.

The embodiment described relative to FIG. 2 and illustrates a circuit which requires the use of complimentary transistors. Experience has shown that it is somewhat less costly to precisely match together pairwise transistors of different conductivity types, because nowadays matched transistor pairs of different conductivity types constructed on a common substrate are available. Under such conditions the embodiment shown in FIG. 2 advantageously is used in those cases where common-mode interfering voltages are of limited significance. This can be the case, e.g. if the main interfering voltage source is a d.c. motor for the drive of the storage medium. In this case the not completely optimum common-mode rejection of the circuit is not so significant, so that the advantage of its very compact construction can be fully utilized.

Figure 3:
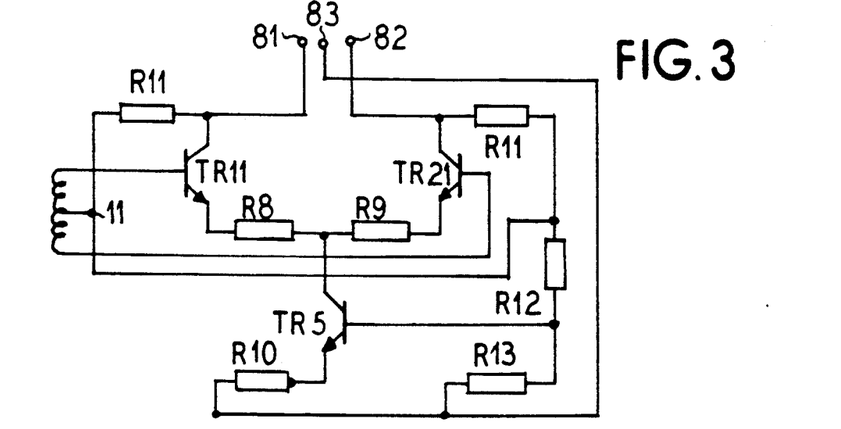
FIG. 3 illustrates a preamplifier input stage that can be directly associated with a field coil instead of that illustrated in FIG. 2.

In FIG. 3 there is illustrated another embodiment of the input stage 41 of the preamplifier 4 that can be directly associated with a magnet coil 1 and in which only non-transistors are used in place of the complimentary transistors. In this embodiment, there is a three-wire connecting line connecting the input stage 41 to the corresponding final stage on the circuit board for the magnetic layer memory electronics, as indicated by the three line terminals 81, 82 and 83. As has still to be explained, the third line terminal 83 is an earth or ground connection and is connected to the corresponding final stage. To each of the two other line terminals 81 and 82 is connected the collector of a transistor TR11 or TR21. The base terminals of the transistors TR11 and TR12 are connected to oppose ends of the magnet coil 1.

Unlike in the case of the circuit arrangement described relative to FIG. 2, in the arrangement of FIG. 3, use is made of the center tap 11 of the magnet coil 1, which permits the use of transistors of only a single conductivity type. This center tap 11 is connected to the collectors of the transistors TR11 and TR21 via collector resistors R11 and therefore also to the line terminals 81 or 82. In addition, the center tap 11 is connected to the line terminal 83, which is coupled to ground via a series connection of two further resistors R12 and R13. The two emitters of the transistors TR11 and TR21 are either connected directly or, as shown, via respective low-value (low resistance) emitter resistors R8 and R9 to the collector of a further transistor TR5, which is used as a current source transistor.

The emitter of the transistor TR5 is connected to the ground terminal 83 via a relatively low-value emitter resistor R10. The base of the transistor TR5 is coupled to a connection point between the two resistors R12 and R13. Thus, the switching transistor TR5 is in the common current path of the two transistors TR11 and TR21 and acts as an internal power supply. All three transistors TR11, TR21 and TR5 consequently are biased from a direct current standpoint via the line terminals 81 and 82.

There is a predetermined d.c. voltage potential at the line terminals 81 and 82 when the circuit arrangement is activated, i.e., the preamplifier of concern is selected. By means of the voltage divider comprising the connection of the series resistors R12 and R13, the transistor TR5 is switched to be conductive and forms together with its emitter resistor R10 a power supply in the current path of the two transistors TR11 and TR21 of the input stage 41.

In the same way a d.c. bias is produced across the high-impedance voltage divider formed by resistors R11, R12 and R13 at the center tap 11 of the magnet coil 1. The bias is in each case superimposed on the voltage induced in one of the two partial windings of the magnet coil 1 during the reading process and is supplied to the base terminal of the transistor TR11 or TR21. The transistors are correspondingly controlled with the read signal amplitude.

An analog common-mode current flows across the line terminals 81 and 82 and is returned across the line terminal 83 to the spatially displaced final stage 42 of the preamplifier 4. In the ideal case, with fully compensated signal branches, this common-mode current is equal on lines 81 and 82 and independent of the instantaneous value of the read signal. Compared with the embodiment described relative to FIG. 2, the circuit arrangement of FIG. 3 with a comparably favorable power consumption offers a better common-mode rejection and a better high frequency transmission characteristic. With respect to the power supply, no individual lines are required, because the d.c. bias is acquired by means of the described resistance network at the collectors of the transistors TR11 and TR21 connected to the line terminals 81 and 82. Further, a high common-mode suppression is achieved in that the unavoidable stray capacitances between the windings of the magnet coil 1 and the collectors of the transistors TR11 and TR21 are matched to one another. It can be appreciated that the embodiment shown in FIG. 3 for an input stage 41 of a preamplifier 4 directly associated with the magnet coil 1 and having a three-wire, twisted, unshielded connecting line to the final stage 42 of the preamplifier 4 across the line terminals 81, 82, and 83, only constitutes a particular circuit design of a general circuit concept, which can be varied in numerous ways.

Figure 4:
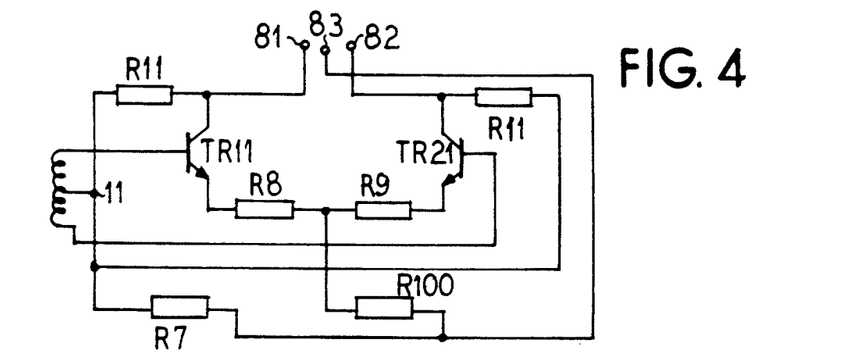
FIG. 4 illustrates another preamplifier input stage that can be directly associated with a field coil instead of that illustrated in FIG. 2.

FIG. 4 shows, by way of example, another embodiment for an input stage 41 of a preamplifier 4 directly spatially associated with a magnet coil. Once again the input stage is connected by a three-wire twisted line across line terminals 81, 82, and 83 to a final stage, which is to be explained. Here again the two circuit branches are symmetrical for the transistors TR11 and TR21. The d.c. bias for these two transistors is produced by means of, in each case, an equally high bias resistance, i e., the collector resistance R11. In addition, the power supply formed by TR5, R10, R12 and R13 of the circuit arrangement of FIG. 3 is replaced by an ohmic resistor R100. The center tap 11 is connected to the earth-carrying or ground line terminal 83 via a further resistor R7. For an identical circuit function, the embodiment of FIG. 4 illustrates how, through the design of the bias network, it is possible to achieve the sought objective with a simplified and therefore compact construction of approximately the stray capacitances acting in the two circuit branches, so that their influence with respect to the sought common-mode rejection is largely cancelled out.

Another circuit, which easily can be implemented, offers high common-mode rejection and can be of compact construction would comprise connecting the earth-carrying or ground line terminal 83 directly to the connecting point between the emitter resistors R8 and R9, i.e., omitting the resistors R7 and R100. The collector resistors R11 would be connected in parallel via a bias diode, e.g., a Zener diode to the center tap 11 of the magnet coil 1.

Figure 5:
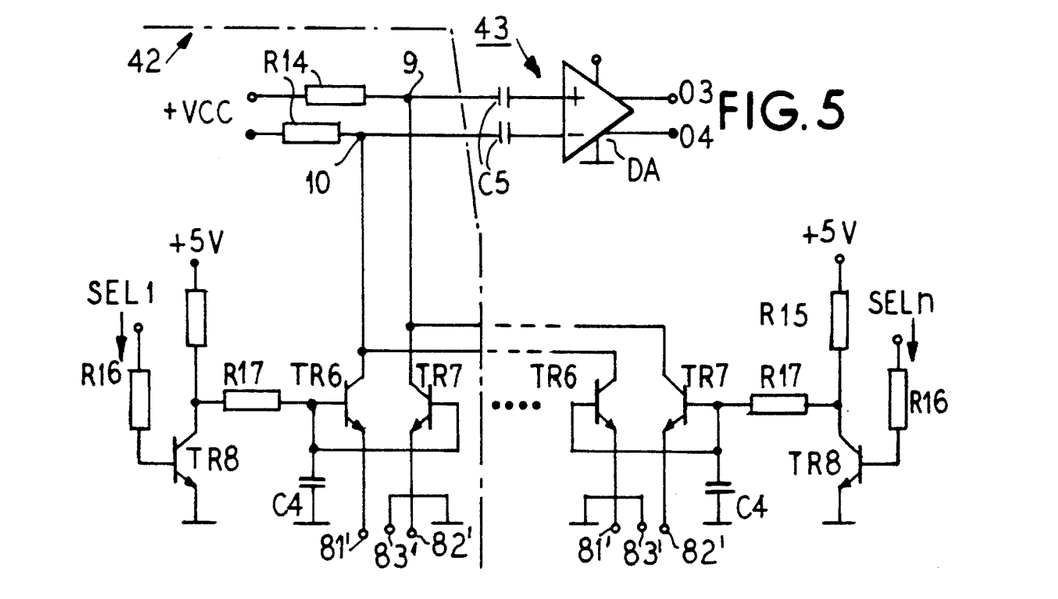
FIG. 5 illustrates a power switching stage for selective switching through of read signals of a magnetic head system or a preamplifier.

FIG. 5 illustrates an example of an arrangement for the construction of the final stage 42 of the preamplifier 4 to which can be connected an input stage 41 configured according to, e.g., FIGS. 3 or 4, via a twisted three-wire connecting line. The circuit arrangement of FIG. 5 is fundamentally a channel switch with a differential amplifier and a plurality of selectively activatable power amplifier stages, which are in each case associated with a magnetic head system, as shown in FIGS. 3 or 4, and which operate on a common power output stage 43. Only two of a plurality of parallel-connected amplifier stages 42 are shown in FIG. 5.

As illustrated, each of the amplifier final output stages 42 has a pair of further transistors TR6 and TR7, whose emitters are connected to line terminals 81' and 82', respectively, which in turn are connected to the corresponding line terminals 81 and 82 of the spatially remote input stage 41 of a preamplifier, according to, e.g., FIGS. 3 or 4, via a three-wire, twisted connecting line. A third line terminal 83' for the third wire of the connecting line is in this case grounded. On the collector side, both transistors TR6 and TR7 are coupled to the supply voltage + VCC via each case, a respective collector resistor R14.

The base terminals of both transistors TR6 and TR7 are coupled in parallel to a switching network having a further transistor TR8 via a resistor R17, whose collector-emitter junction in turn also is coupled to +5 V operating voltage via a collector resistor R15. The emitter of the transistor TR8 is coupled to ground. A selection signal SEL1 or SELn is in each case supplied to the base of the switching transistor TR8 via a resistor R16. These selection signals are produced as control signals for the individual activation of the individual magnetic head systems in the electronics of the read channel 7, as has been explained relative to FIG. 1.

Because the collector of the switching resistor TR8 is connected to the coupling network coupled to the base terminals of the two associated power stage transistors TR6 and TR7, comprising the coupling resistor R17 and a bypass capacitor C4 coupled to ground, the transistor TR8 initiates conductivity of the transistor TR6 and TR7 requested by the corresponding selection signal, e.g., SEL1. By means of a corresponding connecting line, in this state, voltage is supplied to the connected line terminals 81 and 82 of a corresponding input stage 41 according to FIGS. 3 or 4. Otherwise the emitters of the two transistors TR6 or TR7 are in a high-impedance state and consequently block the connected input stage 41 in combination with the corresponding series resistance network.

The common output stage 43 also illustrated in FIG. 5, is associated with all parallel-connected final stages 42 of the preamplifiers. This output stage has a differential voltage amplifier DA, each of whose signal inputs is connected via a further coupling capacitor C5 to a connecting point 9 or 10. These connecting points 9 and 10 are switching nodes, to which are connected one of the collectors of one of the final stage transistors TR6 and TR7. Additionally, the positive supply voltage + VCC across, is applied to these nodes 9 and 10 as previously discussed via a respective collector or load resistor R14. A pair of outputs of the differential voltage amplifier DA forms two signal outputs 03 and 04 of the channel switch, which are connected to inputs of the read channel.

Considered functionally, it is important for this circuit arrangement that the two collector resistors R14 are well matched to one another to achieve a high common-mode rejection. However, a still unavoidable DC voltage at the resistors is removed by the coupling capacitors C5. Finally, remaining in-phase common mode interference voltages are suppressed by the differential voltage amplifier DA.

The described circuit arrangement has the advantage that it is possible to use inexpensive, troublefree transistors, preferably in pairs, in the design of the circuit, because the power consumption of the latter can be optimized for each particular application and is relatively low in accordance with the circuit concept, because current is only required for the selected preamplifier 4, whereas the parallel-connected, further preamplifiers are blocked. The connecting lines can be flexible, shielded lines as well as unshielded lines, crosstalk being avoided in either case, because the non-activated preamplifiers 4 are reliably blocked.

Further circuit configurations are conceivable for the preamplifier final stages 42 shown in FIG. 5. For the preamplifier input stages 41, one particular configuration has been described in connection with the circuit of FIG. 4, wherein there is no need for an internal current source transistor in the input stages 41 (illustrated in FIG. 3 by the current source transistor TR5 and its bias network). Such a current source stage can also be placed in the spatially remote preamplifier final stages.

Instead of directly connecting to ground or earth, the ground or earth carrying line terminal 83', in this case the collector-emitter junction of a current source transistor would be placed in series with an emitter resistor between said line terminal 83' and ground or earth. From a circuitry standpoint this precisely corresponds to the example of FIG. 3 with the sole difference of a different spatial arrangement and consequently no detailed description is required. For the d.c. bias of said transistor it is merely necessary to provide a resistance network located between an adapted supply voltage and earth. Due to the smaller spatial restriction in the final stage area of the preamplifier 4 and the simpler power supply, this configuration offers advantages particularly in critical applications, where great importance is attached to a very compact construction of the input stages.

The inventive features disclosed in the description, drawings and claims can be essential to the realization of the different embodiments of the invention, either singly or in random combinations.

While preferred embodiments have been shown, modifications and changes may become apparent to those skilled in the art which shall fall within the spirit and scope of the invention. It is intended that such modifications and changes be covered by the attached claims.

What is claimed is:

1. A circuit for selectively coupling one of a plurality of magnetic systems of a multiple magnetic head to a read channel of a magnetic layer memory unit, comprising:
   a preamplifier associated with each magnetic system, the preamplifiers having respective signal outputs electrically coupled together in parallel and to the read channel; and
   selection means operatively electrically coupled to said preamplifiers for activating of one of the preamplifiers at a time selected to allow transmission of read signals only from the magnetic system associated with the selected preamplifier to the read channel, each preamplifier including an input stage spatially directly associated with its respective magnetic system, and an output stage spatially separated from the input stage and spatially associated with the read channel, the input and output stages being electrically coupled together by a flexible connecting line, each input stage including means for switching the input stage into a high impedance state as long as the preamplifier is not selected by the selection means.

2. The circuit of claim 1, wherein each of the input and output stages of each preamplifier comprises a pair of transistors, the base terminals of the output stage transistors forming selection inputs by means of which the associated preamplifier can be activated, the collector terminals of the output stage transistors forming the preamplifier signal outputs, the base terminals of the input stage transistors being electrically connected to opposite ends of a magnetic coil associated with the magnetic system associated with the preamplifier.

3. The circuit of claim 2, wherein for direct current biasing of the input stage transistors of each preamplifier, the collector and base of each transistor are electrically coupled together via a relatively high resistance resistor, the bases of the transistors are electrically coupled together via a resistor, and the base of one transistor is electrically coupled to one of the ends of the magnetic coil via a capacitor.

4. The circuit of claim 1, wherein each preamplifier input stage comprises a first transistor electrically coupled to one end of a magnetic coil associated with the magnetic system associated with the preamplifier and a second transistor electrically coupled to another end of the magnetic coil, the first transistor having a base electrically coupled to the magnetic coil via a first capacitor, the first and second transistors having emitters electrically coupled together via a first resistor, the first transistor having a collector electrically coupled to its base via a second resistor, the second transistor having a collector electrically coupled to its base via a third resistor, the bases of the first and second transistors are electrically coupled together via a fourth resistor, and the collectors of the first and second transistors are electrically coupled to respective input stage output terminals.

5. The circuit of claim 4, wherein each preamplifier output stage comprises third and fourth transistors, the third transistor having a collector electrically coupled to a positive supply voltage via a fifth resistor and to a first output stage output terminal via a second capacitor, the third transistor having a base electrically coupled to a first selection signal, the third transistor having an emitter electrically coupled to the collector of the first transistor of the input stage, the fourth transistor having a collector electrically coupled to a negative voltage supply via a sixth resistor and to a second output stage output terminal via a third capacitor, the fourth transistor having an emitter electrically coupled to the collector of the second transistor of the input stage.

6. The circuit of claim 2, wherein each collector of each of the output stage transistors is electrically coupled to a supply voltage via a resistor and electrically coupled to an output stage output terminal via a capacitor.

7. The circuit of claim 3, wherein each collector of each of the output stage transistors is electrically coupled to a supply voltage by a resistor and electrically coupled to an output stage output terminal via a capacitor.

8. The circuit of claim 1, wherein the input and output stages of each preamplifier are electrically connected together by means of two signal lines and a ground line, the ground line being indirectly electrically coupled to a center tap of a magnetic coil associated with the magnetic system associated with the preamplifier, ends of the magnetic coil forming complementary read signal inputs to the input stage.

9. The circuit of claim 8, wherein each input stage comprises two transistors of the same conductivity type so arranged and electrically coupled that each transistor has a base electrically coupled to one end of the magnetic coil and a collector electrically coupled to an output terminal.

10. The circuit of claim 9, wherein for d.c. biasing of the input stage transistors, their collectors are electrically connected to a signal line of the connecting line and are electrically connected to the center tap of the associated magnet coil via a high-impedance coupling network, said coupling network being so constructed that it blocks the input stage transistors when the associated preamplifier is unselected.

11. The circuit of claim 10, wherein the coupling network has a high resistance resistor electrically connected to the collectors of the input stage transistors, which is also electrically connected to the center tap of the magnet coil and across a further resistor to the earth line.

12. The circuit of claim 9, wherein a switching transistor is electrically coupled between the ground line and the emitters of the input stage transistors, the switching transistor having a base electrically connected to a voltage divider coupled between the center tap of the magnet coil and the ground line.

13. The circuit of claim 1, wherein each preamplifier final stage includes a selection network for the selective activation of the associated preamplifier by means of a selection signal comprising a switching transistor whose collector is electrically coupled to an operating voltage source via a resistor, whose emitter is electrically coupled to ground, to whose base is supplied the selection signal via a resistor and whose collector is electrically connected across a coupling low-pass filter in parallel to the base terminals of the final stage transistors.

14. The circuit of claim 13, wherein the further amplifying stage is constructed as a differential voltage amplifier, to whose first and second signal inputs are applied in each case jointly the collectors of their final stage transistors of one of the two signal paths via in each case one coupling capacitor and whose outputs in each case form one of the terminals at the read channel.

15. A circuit configured to selectively couple read signals from a selected one of a plurality of magnetic systems of a magnetic head to a read channel in a magnetic memory device, comprising:
   a magnetic coil in each magnetic system;
   a preamplifier electrically coupled between the magnetic coil and the read channel, the preamplifier comprising spatially separated and input and output stages, the input stage being spatially associated with the magnetic coil, the output stage being spatially positioned with the read channel, the input and output stages having respective terminals which are electrically connected by a flexible connecting line, the input stage including means placing its terminals electrically connected to said line at a high impedance as long as the magnetic system of the magnetic coil coupled to the preamplifier is not electrically coupled to the read channel; and
   selection means operatively electrically coupled to each output stage for supplying a selection signal thereto to select coupling of the magnetic coil electrically coupled to its preamplifier to the read channel.

16. The circuit of claim 15, wherein the input stage comprises two amplifiers, each amplifier having an input electrically coupled to one end of the magnetic coil and an output electrically coupled to an output terminal of the input stage.

17. The circuit of claim 15, wherein the connecting line comprises a twisted wire connection.

* * * * *